United States Patent [19]

Mahrus

[11] 4,333,775
[45] Jun. 8, 1982

[54] METHOD OF PRODUCING ALUMINUM ALLOY COMPOSITE

[75] Inventor: Duraid Mahrus, Sao Paulo, Brazil

[73] Assignee: Metal Leve S.A. Industria e Comercio, Brazil

[21] Appl. No.: 165,054

[22] Filed: Jul. 1, 1980

Related U.S. Application Data

[63] Continuation-in-part of Ser. No. 56,189, Jul. 10, 1979, abandoned.

[30] Foreign Application Priority Data

Jul. 14, 1978 [BR] Brazil .............................. 7804586[U]

[51] Int. Cl.³ .............................................. C22F 1/04
[52] U.S. Cl. .............................. 148/11.5 Q; 75/0.5 C; 427/320; 427/328; 427/360; 427/383.7; 420/554; 428/654
[58] Field of Search ..................... 148/11.5 A, 11.5 Q; 427/320, 328, 360, 383.7; 29/420, 420.5; 75/0.5 C, 138, 140

[56] References Cited

U.S. PATENT DOCUMENTS 3,432,293  3/1969  Michael et al. ...................... 75/138
4,069,369  1/1978  Fedor et al. .......................... 75/140

Primary Examiner—R. Dean
Attorney, Agent, or Firm—Steinberg & Raskin

[57] ABSTRACT

The invention relates to the depositing of aluminum alloys useful as material for the manufacture of sleeve bearings. Aluminum and lead in the proper ratio are melted in a furnace, transferred to a holding furnace wherein the temperature of the melt is maintained within the molten range, and the melt is directed to an atomizing or nebulizing chamber. According to the invention, the molten material flowing into the atomization chamber is subjected to an atomizing gas flow having a specified angle of incidence to atomize the molten flow of alloy into small particles which are directly deposited on a continuous pure aluminum strip which moves under the atomization chamber at a preset rate, the aluminum strip with the alloy layer is submitted to a rolling operation and thereafter the strip is rolled together with a steel strip, to provide a cladding of the alloy-aluminum onto the steel of the backing and supporting strip.

7 Claims, 1 Drawing Figure

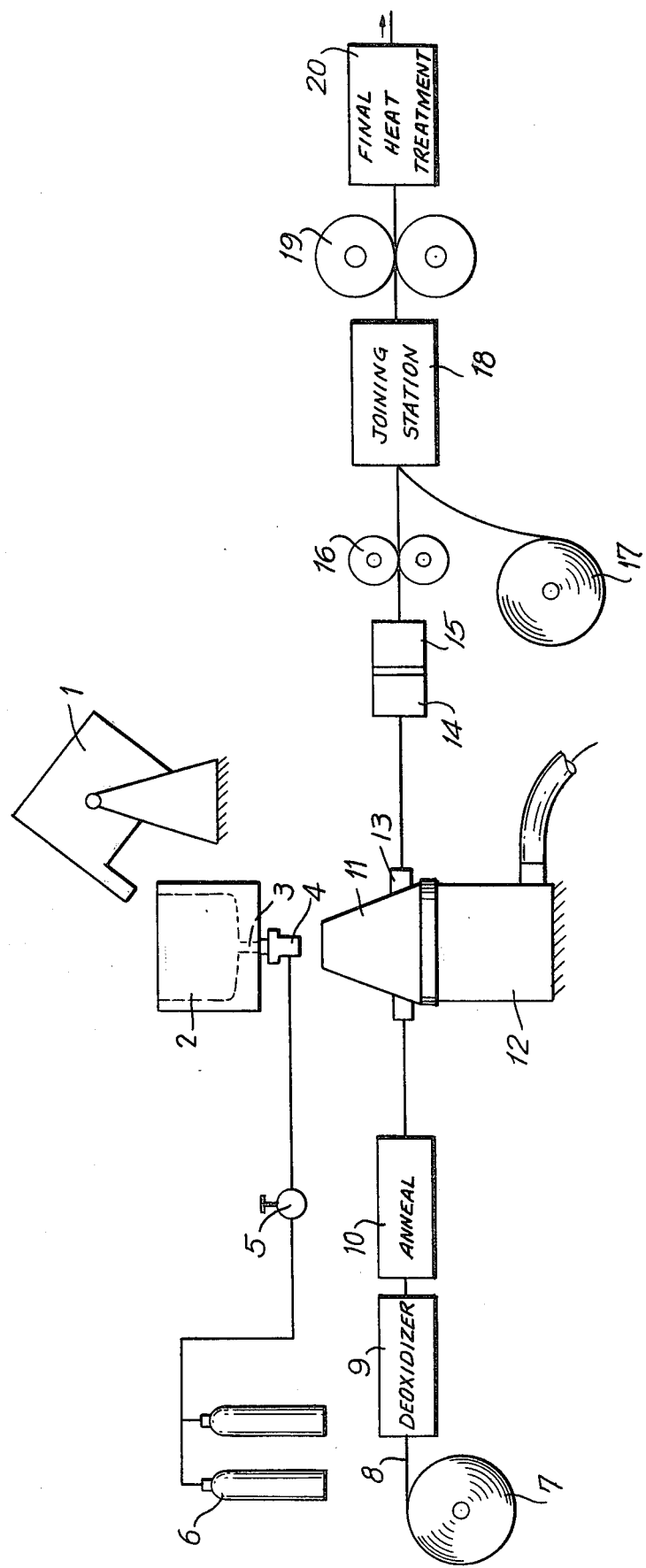

METHOD OF PRODUCING ALUMINUM ALLOY COMPOSITE

CROSS REFERENCE TO RELATED APPLICATIONS

This application is a continuation-in-part of my copending application Ser. No. 56,189 filed July 10, 1979 entitled "An Improved Method of Deposition Aluminum Alloys", abandoned.

BACKGROUND OF THE INVENTION

The advantage of using aluminum-lead alloys (Al-Pb) as a material for the manufacture of plain bearings is based on the fact that, besides being an excellent solid lubricant, Pb is abundant and has a low price. The problem encountered in preparing such alloys of lead contents ranging from 5 to 20 wt.% arises out of the low solubility of lead in aluminum at room temperature. To obtain complete solution of 8.5% lead in aluminum the alloy must be submitted to a temperature of at least 900° C. Upon slow-cooling of an alloy of these elements, a complete precipitation and dissociation of the compounds takes place and, because of the great difference between their densities, causes a complete segregation of the lead which then rests on the bottom of the sample.

Notwithstanding this problem, the advantages offered by Al-Pb alloys gave rise to different methods aimed at the manufacture of bearing materials.

According to one of the prior art methods, the alloys, heated to the point of solubility of lead in aluminum, are rapidly atomized, to form a powder with the particles solidifying prior to segregation of the lead, the powder resulting from such atomization is collected and rolled to form a strip which is then bonded and laminated on a steel strip. The required rolling and lamination operations are complex and require sophisticated equipment.

According to another prior art method, the Al-Pb alloy, in dissolved state between the components, is cast directly on a steel strip. This method has several problems, among which are the segregation of lead during the relatively slow cooling and an extremely frail bonding.

SUMMARY OF THE INVENTION

It is accordingly a primary object of the present invention to provide an improved method of depositing Al-Pb alloys which overcomes the disadvantages of the heretofore used methods.

It is a further object of the present invention to provide an improved method of depositing aluminum alloys so as to obtain materials which are particularly useful as bearing materials for the manufacture of plain or sleeve bearings.

It is yet a further object of the present invention to provide for the production of aluminum-lead alloys without segregation of the lead occurring.

Other objects and advantages of the present invention will be apparent from a further reading of the specification and of the appended claims.

With the above and other objects in view, the present invention mainly comprises melting the Al-Pb in a stirred furnace, e.g. an induction furnace (2000-5000 Hz), then the molten alloy is transferred to a holding furnace, the alloy flows through an outlet at the bottom holding furnace. There, the alloy is intercepted and impinged by a gas flow having a prescribed angle of incidence of between 20° and 45°, proceeding from an atomizing device located directly under the furnace, thereby causing the disintegration of the molten metal fillet or stream and forming molten particles which are directly deposited on a continuous pure aluminum strip previously annealed and deoxidized, which travels steadily at a preset rate past the atomization zone.

Each powder particle thus produced and deposited on the aluminum strip has the desired chemical composition and particularly the desired lead distribution, since the atomization affords a fairly rapid cooling of each particle thereby precluding the segregation of the lead. Grain or particle size may be controlled by varying the atomizing gas pressure and the diameter of the outlet. To reduce the average size of the particles, one may increase gas pressure, reduce the outlet diameter or carry out both operations simultaneously, and conversely, to increase the particle size.

According to the method of this invention, the metal stream being atomized is enclosed in a duct having its lower end connected to an exhaust and filtering system to confine any powder particles which are not deposited on the aluminum strip. This prevents pollution of the environment.

The aluminum strip to be coated with the Al-Pb alloy is heated to an appropriate temperature and positioned so that the atomized liquid particles reach the strip prior to their complete solidification. The shape of the cone formed by the atomized particles can be adjusted by conventional spray head to a shape suitable to cover the desired width of the strip.

Since the particles are not entirely solidified when impinging on the aluminum strip, they undergo a flattening and a subsequent thickening operation, thereby promoting both the bonding to the backing strip and the bonding among particles, and also a density increase of the layer thus formed.

The nature of the atomizing fluid may be changed according to the amount of surface oxides present in the particles. The atomizing gas preferably used is compressed air, free of moisture, but a neutral gas such as nitrogen and argon may be employed, thus better protecting from oxidation the particles and the pure aluminum strip enclosed in the atomization chamber.

The amount of deposited material on the pure aluminum strip may be increased with the aid of gas curtains positioned to control the geometry of the originally produced cone of sprayed molten particles.

The thickness of the Al-Pb layer deposited on the pure aluminum strip is preferably controlled by the moving rate of the strip past the spray. Other variables such as the diameter of the molten metal stream and atomizing gas outlets also have a secondary influence on thickness of the deposited layer.

The newly-deposited layer is hot compacted by means of compacting conveyors or rolling mills to increase the density and planarity of the surface. It may be machined followed by a first cold or hot rolling for total or partial elimination of the porosity. Rolling and annealing also improves the metallic bonding between the deposited alloy layer and the backing strip. The bonding between the layer and the backing plate is facilitated due to the fact that the base material of the aluminum alloy layer is the same as that of the aluminum backing strip. The cooling rate is high enough to preclude the formation of frail intermetallic compounds on the interface.

Subsequently and preferably, the composite of the pure aluminum strip having an Al-Pb layer deposited on it is submitted to an annealing surface treatment and hot or cold rolled onto a steel strip which has its surface deoxidized and annealed. The purpose of this additional rolling is to provide a cladding of the alloy-aluminum strip composite on the steel which functions as a mechanical backing to the antifriction alloy layer. The resulting strip is then heat treated to improve the metallic bonding between the aluminum and the steel, and is then machined and formed for use in the manufacture of the final bearings.

The equipment and devices required to perform the method such as the induction furnace, the tundish with a bottom outlet for flow of the alloy, the atomization facility and conveying and rolling devices, are generally conventional for each unit operation or process step. It is the deposition of the alloy to the aluminum strip that provides the superior composite for bearing materials.

Generally the best anti-friction aluminum-based alloys for use in bearings have lead contents of from about 5 to 20 wt%. The nature of this alloy composition due to the very low solubility of lead in aluminum at room temperature is one of great instability. The temperatures required to form stable alloys wherein the lead is totally dissolved in the aluminum varies according to the Al-Pb metallurgical phase diagram as appearing in metallurgical references. Preferred among these alloys for bearing purposes because of its combination of lubricity and structural strength is the alloy that contained about 8.5% lead. This alloy requires a temperature of at least 900° C.(1677° F.) to attain complete solution of the lead in the aluminum. This solution alloy is then atomized.

BRIEF DESCRIPTION OF THE DRAWING

The invention is illustrated by way of example in the accompanying drawing which constitutes a flow chart showing the equipment and operation sequence for practicing the present invention, including the preferred embodiment wherein the composite aluminum alloy strip is joined to a steel supporting strip.

DESCRIPTION OF PREFERRED EMBODIMENTS

The alloy is formed by melting the lead and aluminum in induction furnace 1. The alloy composition for preparing bearing materials should be about 5 to 20% lead in aluminum. Preferred is the alloy containing about 8.5% Pb in the Al, the alloy components are melted in induction furnace 1 at a temperature in excess of about 900° C., preferably about 900° to 950° C. The homogeniety of the melt is assured by the mixing action of the magnetic flux characteristic of the induction furnace 1.

The melt from furnace 1 is transferred to holding and transfer furnace 2 which acts as a tundish to maintain an even hydraulic head. Holding furnace 2 for its tundish function is provided with an outlet nozzle 3, leading the alloy melt to the atomizer section 4. At atomizer section 4, the melt intercepts a controlled and shaped atomizing gas stream from compressed gas source 6 via gas-pressure controller 5. The gas is either compressed dried air, or a dry inert gas such as nitrogen.

The stream of the melt from outlet nozzle 3 is atomized by the gas jets which strike the stream at an incidence angle in the range of about 20° to 45°. The choice of the incidence angle within this range depends on the operation of the equipment. It has been found that at a gas incidence angle of about 30°, the clogging of the melt outlet 3 atomizer nozzle is minimized and that the solid angle or pattern of the resultant particles is constantly controllable together with other atomizing variables such as gas pressure. While particle size can be partially controlled by the gas-flow incidence angle, particle size is more easily controlled by other variables such as gas pressure.

Preferably the gases used for atomization may be at or about room temperature but they may be heated, depending on the heat capacity of the aluminum strip, the particle size of the atomized particles, and the throw distance between the outlet and the aluminum strip.

The aluminum strip 8 from roll 7 of pure aluminum sheet is fed into a surface treatment zone 9 where it is cleaned and deoxidized. It is then fed through anneal tunnel 10 where the deoxidized surface is dead annealed and introduced into the spray chamber 11 where the droplet particles from atomizer 4 deposit and then congeal on the strip surface. Spray chamber 11 is provided with strip temperature control means 13 to ensure that the molten particles striking the aluminum strip surface congeal and freeze thereon. With an atomizer strip distance of 30-40 cm, strip temperatures between 200° and 400° C. provide satisfactory deposits of alloys on the aluminum strip. The spray chamber 11 also is provided with cyclone chambers and filter 12 to entrap the particles which do not adhere to the strip.

The composite of the alloy particles congealed on the strip is then compacted to reduce its density and then the composite is annealed in heated chamber 15. The annealed composite is then rolled, hot or cold, in rolling mill 16 until the alloy particles are completely densified and the alloy layer is bonded to the aluminum strip.

Upon completion of the bonding of the composite in rolling mill 16, its pure aluminum face is juxtaposed to a supporting steel strip from stock roll 17. The facing steel strip surface is previously prepared by surface cleaning and deoxidation, preheated and juxtaposed to the composite in joining station 18. The composite-steel strip assembly is then rolled in second rolling mill 19 until the composite is securely bonded along its aluminum face to the steel strip to form the final bearing material. This final material of low friction for the preparation of bearings is then completely annealed and rolled until fashioned into bearings.

What is claimed is:

1. Method of producing Al-Pb alloy low-friction composite suitable for the manufacture of bearing materials, which comprises forming an alloy melt of 5 to 20% lead in aluminum, atomizing said melt by the impingement, at an angle of 20°-45° of a thin stream of said alloy with a gas stream to form a pattern of liquid particles of said melt, directing said particle pattern onto a face of a moving aluminum strip under conditions such that the particles are liquid at the time of contacing the aluminum strip and solidify on said strip shortly after contact therewith to form an alloy coating thereon, compacting and rolling said coated strip to bond said coating to said aluminum strip and form an alloy composite of said Al-Pb alloy bonded to said aluminum strip.

2. The method according to claim 1 wherein said alloy is melted at temperatures in the range of about 900° to 1000° C. by use of an induction melting furnace and then, after transfer to a holding furnace provided with a tundish, atomizing said melt within said temperature range.

3. The method according to claim 2 wherein said atomization stream is an impinging jet of a compressed gas selected from the group consisting of dry air, notrogen and argon.

4. The method according to claim 1 wherein the aluminum strip coated with the pattern of particles is subjected to heat treatments and rolling operations to eliminate porosities in the coating.

5. The method according to claim 4 wherein said composite is further heat treated and juxtaposed to a steel supporting strip and the composite bonded thereto by a further rolling operation to form a supported alloy material suitable for the fabrication of bearings.

6. The method according to claim 1 wherein said alloy contains about 8.5% lead, is melted at a temperature of about 900° to 950° C., the melt is atomized to form liquid particles by a jet of compressed air impinging at an angle of about 30°, said particles being patterned by accessory jets to evenly coat the surface of the aluminum strip, said coat is annealed and rolled to bond same to said strip to form a composite, and said composite is bonded to a steel sheet support to form a bearing material.

7. Method according to claim 1 wherein said aluminum strip is pure aluminum which is cleaned and deoxidized, and dead annealed prior to the directing of the atomized liquid particles of Al-Pb alloy thereon.

* * * * *